US007073029B2

(12) United States Patent
Uysal et al.

(10) Patent No.: US 7,073,029 B2
(45) Date of Patent: Jul. 4, 2006

(54) STORAGE SYSTEM USING FAST STORAGE AND LOG-STRUCTURED STORAGE

(75) Inventors: Mustafa Uysal, Davis, CA (US); Arif Merchant, Los Altos, CA (US); Guillermo A. Alvarez, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 383 days.

(21) Appl. No.: 10/351,357

(22) Filed: Jan. 27, 2003

(65) Prior Publication Data

US 2004/0148462 A1    Jul. 29, 2004

(51) Int. Cl.
*G06F 12/08* (2006.01)
(52) U.S. Cl. .................. 711/122; 711/156; 711/162
(58) Field of Classification Search ............... 711/114, 711/136, 162, 112, 117, 122, 156, 155; 710/52
See application file for complete search history.

(56) References Cited

U.S. PATENT DOCUMENTS

| | | | | |
|---|---|---|---|---|
| 5,418,921 | A | * | 5/1995 | Cortney et al. ............. 711/114 |
| 5,551,003 | A | * | 8/1996 | Mattson et al. ............. 711/136 |
| 5,754,888 | A | * | 5/1998 | Yang et al. .................... 710/52 |
| 6,240,487 | B1 | * | 5/2001 | Liu et al. ..................... 711/127 |
| 6,256,705 | B1 | | 7/2001 | Li et al. |
| 6,502,174 | B1 | * | 12/2002 | Beardsley et al. ........... 711/170 |
| 6,738,863 | B1 | * | 5/2004 | Butterworth et al. ........ 711/114 |
| 2002/0118582 | A1 | * | 8/2002 | Butterworth et al. ........ 365/200 |

OTHER PUBLICATIONS

"Computer Sciences and Engineering Handbook", Tucker et al,1997, CRC Press, pp. 1773.*
Hu, Yiming and Yang, Qing; "DCD—Disk Caching Disk: A New Approach for Boosting I/O Performance;" Dept. of Electrical & Computer Engineering, University of Rhode Island, Kingston, RI 02881, May 1996, pp. 169-178.
Menon, Jai and Mattson, Dick; "Distributed Sparing in Disk Arrays;" IBM Almaden Research Center, San Jose, California 95120-6099, 1992, pp. 410-421.
Merchant, Arif and Yu, Phillip S.; "Analytic Modeling and Comparisons of Striping Strategies for Replicated Disk Arrays;" IEEE Transactions on Computers, vol. 44, No. 3, Mar. 1995, pp. 419-433.
Alvarez, Guillermo et al.; Tolerating Multiple Failures in RAID Architectures with Optimal Storage and Uniform Declustering; Jun. 1997, pp. 62-72; Proc. of the 24th Annual ACM/IEEE (ISCA'97), Denver, Colorado.

(Continued)

*Primary Examiner*—Pierre-Michel Bataille
(74) *Attorney, Agent, or Firm*—Richard P. Lange

(57) ABSTRACT

A computer storage system includes a controller and a storage device array. The storage device array includes a first sub-array and a fast storage device sub-array. The first sub-array includes one or more log-structured storage devices storing data. The fast storage device sub-array includes one or more fast storage devices storing a copy of the data stored in the first sub-array.

32 Claims, 6 Drawing Sheets

OTHER PUBLICATIONS

Anderson, Eric et al.; Selecting RAID Levels for Disk Arrays; Conference on File and Storage Technologies (FAST), pp. 189-201. USINEX, Jan. 2002.

Uysal, Mustafa et al.; Using MEMS-based Storage in Disk Arrays; Sep. 10, 2002; pp. 1-12.

Chiueh, T. et al. "Trail: A Fast Synchronous Write Disk Subsystem Using Track-Based Logging", Computer Science Dept., State Univ. of NY at Stony Brook, NY 11794-4400, p. 1-22.

Hu, Y et al., "Rapid-Cache-A Reliable and Inexpensive Write for Disk I/O Systems" Dept. of Electrical & Computer Engineering, Univ. of Rhode Island, RI, Jan. 1999, p. 1-10.

Solworth, J. et al., "Distorted Mirrors", Univ. of Illinois at Chicago, Apr. 1991, p. 10-17.

McNutt, B. "Background Data Movement in a Log-Structured Disk Subsystem", International Business Machines Corp., 1994.

* cited by examiner

STORAGE SYSTEM USING FAST STORAGE AND LOG-STRUCTURED STORAGE

FIELD OF THE INVENTION

The invention pertains to computer storage systems. More particularly, this invention relates to a computer storage system utilizing fast storage devices.

BACKGROUND OF THE INVENTION

Disk arrays are used to provide storage for computer applications that need increased reliability in the face of component failures, as well as high performance for normal use. The disks in the disk arrays are often arranged as a redundant array of independent disks (RAID). The RAID arrays provide larger capacity, higher performance and, typically, higher availability for stored data than using disks individually. This is done by distributing the data across multiple disks and by including back-up information. The back-up information may be a copy of the data or enough parity information to regenerate the data if a disk or related component fails. Storing a copy of the data usually provides higher performance for read operations, as any of the available copies can be read.

One problem with the use of disks is that disks are relatively inefficient in accessing small amounts of data that are not sequentially laid out on the disk. In a typical 4 KB read, a current disk might require between 5 and 20 ms to position the disk head before beginning to transfer data, and less than 0.5 ms for transferring the data. A non-computer analogy is a repairman billing a customer 1 hour for traveling and 5 minutes for fixing an appliance. Since disk head positioning times are improving very slowly, positioning time is likely to remain an issue. When redundant copies of the data are stored in the array, small writes can be even more inefficient, because disk heads corresponding to each of the multiple copies must spend time to position themselves before writing a small amount of data.

SUMMARY OF THE INVENTION

According to an embodiment of the invention, a computer storage system comprises a controller configured to perform data operations and a storage device array including a first sub-array and a fast storage sub-array storing data redundant to data stored in the first sub-array. The first sub-array includes at least one log-structured storage device, and the fast storage sub-array includes at least one fast storage device.

According to another embodiment of the invention, a method for cleaning an extent comprises retrieving data being cleaned from the at least one fast storage device; and appending the data being cleaned to at least one current extent in at least one log-structured storage device.

According to yet another embodiment of the invention, a method comprises receiving a request to perform a data operation; determining whether the request provokes a write operation on the storage system; and in response to the request provoking a write operation, writing data to at least one log-structured storage device and writing redundant data to at least one fast storage device.

According to yet another embodiment of the invention, a method comprises determining whether at least one log-structured storage device failed; reading data from at least one fast storage device in response to the at least one log-structured storage device being failed, the read data including data redundant to the data stored on the at least one failed log-structured storage device; and writing the redundant data to a log-structured storage device that is operative in the storage system.

According to yet another embodiment of the invention, a computer storage apparatus comprises a controller means for performing data operations and a storage array means for storing data. The storage array means includes a first sub-array means for storing data using a log-structured algorithm and a fast storage sub-array means for storing data redundant to data stored in the first sub-array means, wherein the fast storage sub-array means includes one or more fast storage devices.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well-known structures, interfaces, and processes have not been shown in detail in order not to unnecessarily obscure the present invention.

Figure 1:
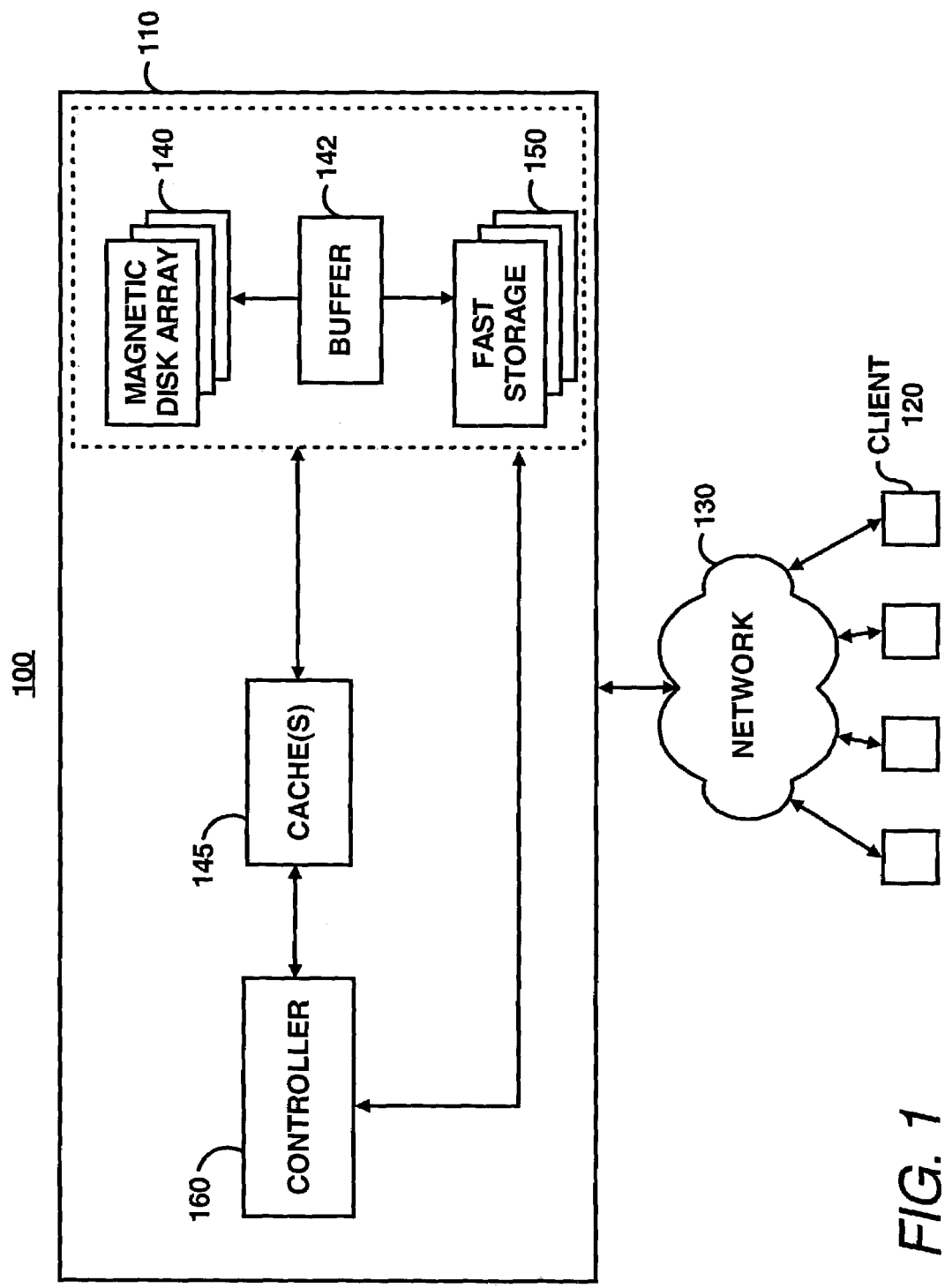
FIG. 1 illustrates a computer system, according to an embodiment of the invention.

FIG. 1 illustrates a computer system 100, according to an embodiment of the invention. The computer system 100 includes a storage device 110 connected to at least one client 120 (e.g., a server or another type of computing device) via a network 130. The storage device 110 includes multiple magnetic disks 140 and multiple fast storage devices 150 connected to a controller 160, which manages data operations for the disks 140 and the fast storage devices 150.

The storage device 110 may optionally include one or more caches 145 for caching data for the disks 140 and the fast storage devices 150. FIG. 1 illustrates one or more caches 145 connected to the disks 140, the fast storage devices 150, and the controller 160. An optional buffer 142, which may include volatile memory, can be used as a buffer for copying between the two sub-arrays 140 and 150, such as for a fault recovery operation and for a compaction operation (also known as a cleaning operation). Alternatively, the cache 145 may be used as the buffer.

The fast storage devices 150 may include one or more of several kinds of storage devices which have a smaller overhead than conventional magnetic disks before starting data transfers. The fast storage devices 150 may have data transfer rates similar to and/or better than conventional magnetic disks, but shorter positioning times. One example of a fast storage device is a micro-electro-mechanical system (MEMS) storage device.

The controller is connected to the cache 145 for performing I/O operations in the storage device 110. Also, the controller 160 may be connected to the disks 140, the fast storage devices 150, and the buffer 142 for performing cleaning operations (described in detail below) and other tasks. It will be apparent to one of ordinary skill in the art that the controller 160 may be a component separate from the disks 140 and the fast storage devices 150. Furthermore, the controller 160 may be implemented with software components, instead of hardware components, or both software and hardware components. Also, the controller 160 may include one or more controllers. In addition, the computer system 100 is not limited to using the network 130, and one or more clients 120 may be directly connected to the storage device 110.

It will be apparent to one of ordinary skill in the art that the storage device 110 may include any type of persistent storage devices. The storage device 140 is not limited to magnetic hard disks and may alternatively include another type of storage media (e.g., optical disks, tapes, etc.). In addition, the fast storage devices 150 are not limited to MEMS and may include other fast storage devices, such as flash RAM, magneto-resistive RAM (MRAM), battery-backed DRAM or SRAM, etc. Also, the disks 140 and fast storage devices 150 may not be in one enclosure or even in one location. Furthermore, the disks 140, the fast storage devices 150, and the controller 160 may be connected via one or more networks.

In one embodiment, the storage device 110 includes two sub-arrays 140 and 150. The disk sub-array 140 is an array of disks and the fast storage device sub-array 150 is an array of fast storage devices storing redundant data, which is a copy of the data stored on the disk sub-array. The disk sub-array 140 may have at least as much capacity as the fast storage sub-array 150. The cache 145 may include a non-volatile memory for storing metadata, such as descriptions of where various data are located, and temporary storage for I/O operations.

Figure 2:
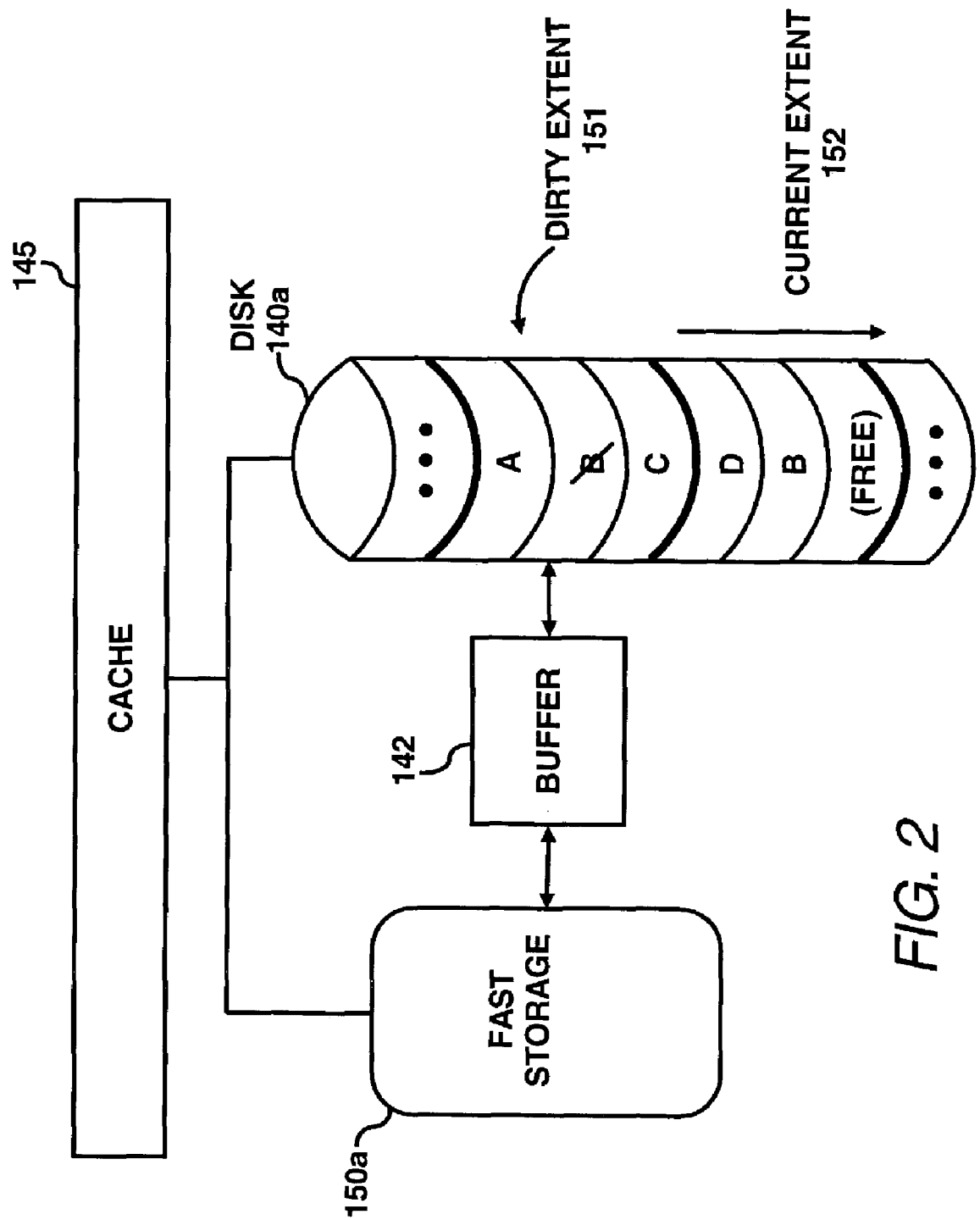
FIG. 2 illustrates a storage device including a log-structured disk sub-array and fast storage devices, according to an embodiment of the invention.

FIG. 2 illustrates a log-structured disk (e.g., a disk using a log-structured algorithm for performing I/O operations) in the storage device 110, according to an embodiment of the invention. A log-structured disk 140a in the disk sub-array 140 and a fast storage device 150a in the fast storage sub-array 150 are shown. The data stored on the fast storage sub-array 150, including the fast storage device 150a, may be striped, such as in a RAID 0 format. Updates to the data stored in the fast storage sub-array 150 are made in place (i.e., the data block being updated is over-written).

A log-structured layout may be used for the disks in the disk sub-array 140. FIG. 2 shows a disk 140a of the disk sub-array 140 employing a log-structured layout (any of the disks in the disk sub-array 140 may employ the log-structured layout), according to an embodiment of the invention. The space in the disk 140a is divided into extents. An extent may include a predetermined number of data blocks. One of the extents is designated as a current extent, which will be used for writing data. Also, an extent is considered a dirty extent, if the extent contains the most recent updated version of at least one data block (i.e., valid data). Extents may also contain invalid data, i.e., one or more data blocks having a more recent copy in another extent. If an extent does not contain any valid data blocks, the extent is called a clean extent (i.e., all the data blocks in the clean extent have a more recent copy in some other extent). A dirty extent 151 and a current extent 152 are shown for the disk 140a.

The controller 160 of FIG. 1 uses a log-structured algorithm, according to an embodiment of the invention, to perform I/O operations on the storage device 110. For example, the controller 160 appends all data updates to a current extent to minimize disk head positioning time. A metadata is kept of data written to the storage device 110 for indicating the locations of the most recent copies of the data blocks. The metadata may indicate the location of the most recent version of a data block and the status of a data block (e.g., valid or invalid). The metadata may be stored in non-volatile memory, such as memory 145, or in the fast storage sub-array 150. The controller 160 may maintain the metadata, as described above.

FIG. 2 illustrates updating data block B. Instead of moving a disk head to a location of the data being updated, the update for data block B is written to the end of the current extent 152 (i.e., using the current extent as an append-only log). A metadata is updated to indicate that the previous data block is invalid. The extent containing valid data is marked as dirty (e.g., dirty extent 152) in the metadata. The previously-dirty extent 151 may eventually be marked as clean if all the data in that extent becomes invalid. Data may continue to be sequentially written to the current extent 152 until that extent is full, sustaining peak transfer rates for the disk 140a. Then, another clean extent is selected.

An I/O operation which overwrites a data block may supersede portions of a previously-written extent on a disk, thus making the older extent sparsely populated with valid data. Such extents are transformed into usable empty space by cleaning, which also may be referred to as compacting. One extent may be cleaned at a time.

An extent may be cleaned during idle periods (when there are no I/O operations pending for the fast-store sub-array). The data corresponding to valid blocks in an extent being cleaned (e.g., the dirty extent 151) are read from the fast storage sub-array 150 storing a copy of the data in the disk sub-array 140. By reading data from the fast storage sub-array 150, the disk head needs not switch between the current extent and the extent being cleaned for cleaning. Furthermore, the fast storage sub-array 150 can read the valid data more efficiently due to its superior access characteristics, without incurring any disk-head seeks on the disk sub-array 140.

FIG. 2 shows the dirty extent 151. The dirty extent 151 includes valid data and invalid data. To clean the extent, the valid data (e.g., data blocks A and C) are read from the fast storage sub-array 150 and stored in the buffer 142. The data blocks A and C may then be written to the end of the current extent 152. After all the valid data is written to the current extent 152, the dirty extent 151 is marked as clean in the metadata. Then, the extent 151 may be used as a current extent for appending data.

When the current extent 152 is filled, the nearest clean extent is chosen as the new current extent. If no clean extent is available, the extent with the greatest number of invalid blocks is selected or the controller 160 of FIG. 1 waits for a new clean extent to become available. Since most writes are appended to the current extent, no disk head seeks are required. By keeping data for cleaning in the buffer 142, the disk 140a can keep writing at all times (except when moving to a new current extent), thus maximizing its write throughput.

Figure 3:
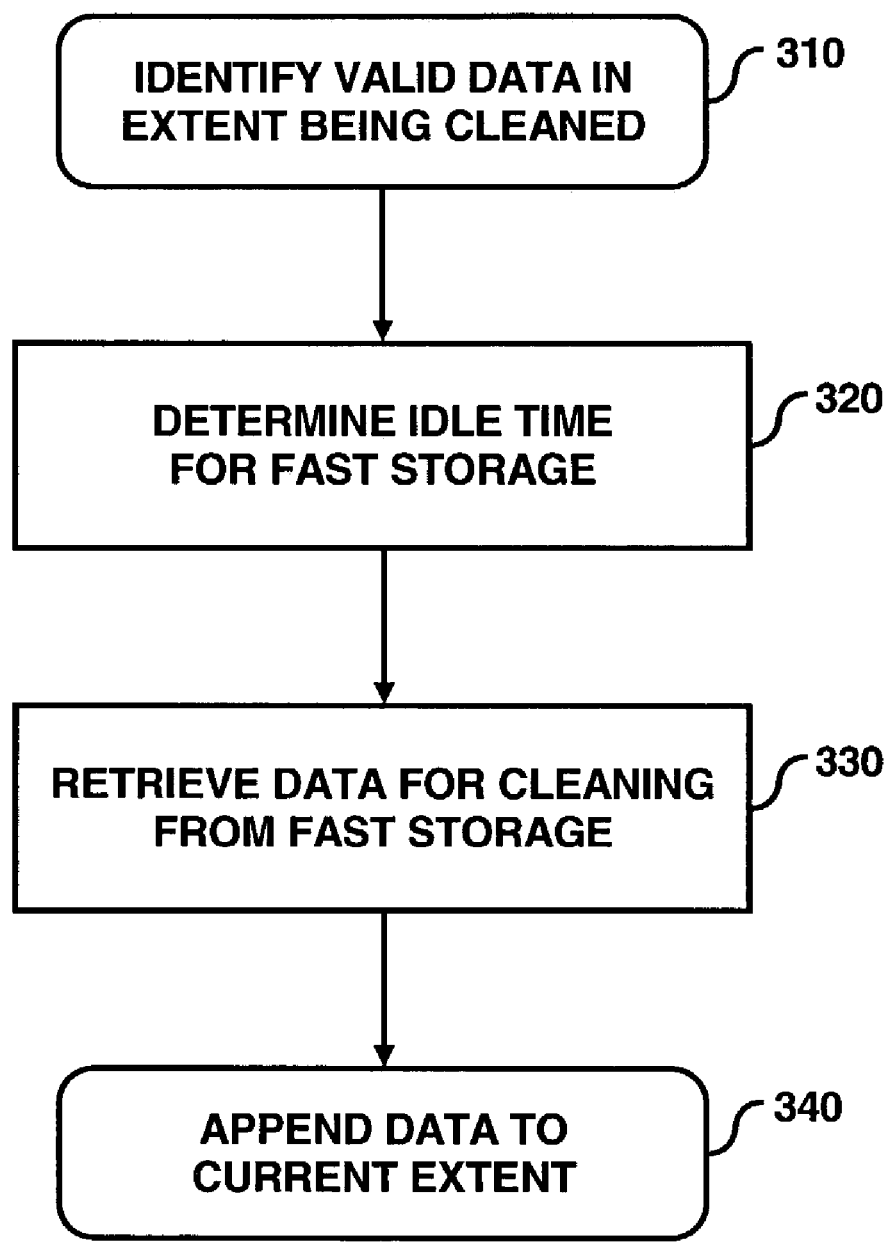
FIG. 3 illustrates a flow diagram of a method for cleaning an extent in a log-structured disk, according to an embodiment of the invention.

FIG. 3 illustrates a flow diagram of a method 300 for cleaning an extent in a log-structured disk, according to an embodiment of the invention. In step 310, valid data in an extent being cleaned is identified. In step 320, an idle time is detected for the fast storage sub-array 150. An idle time may include a time when the level of activity for the fast storage sub-array 150 falls below a threshold. A timeout may be used to force a copy if an idle time is not detected within a predetermined period of time. In step 330, a copy of the valid data is retrieved from the fast storage sub-array 150 and stored in the buffer 142. In step 340, the data from the buffer 142 is appended to the current extent(s). For example, when the current extent is filled, the nearest clean extent (if available) is chosen as the new current extent. If no clean extent is available, the extent with the greatest number of invalid blocks is selected or the controller 160 of FIG. 1 waits for a new clean extent to become available. According to an embodiment, the steps of the method 300 may be performed by the controller 160 of FIG. 1.

Figure 4:
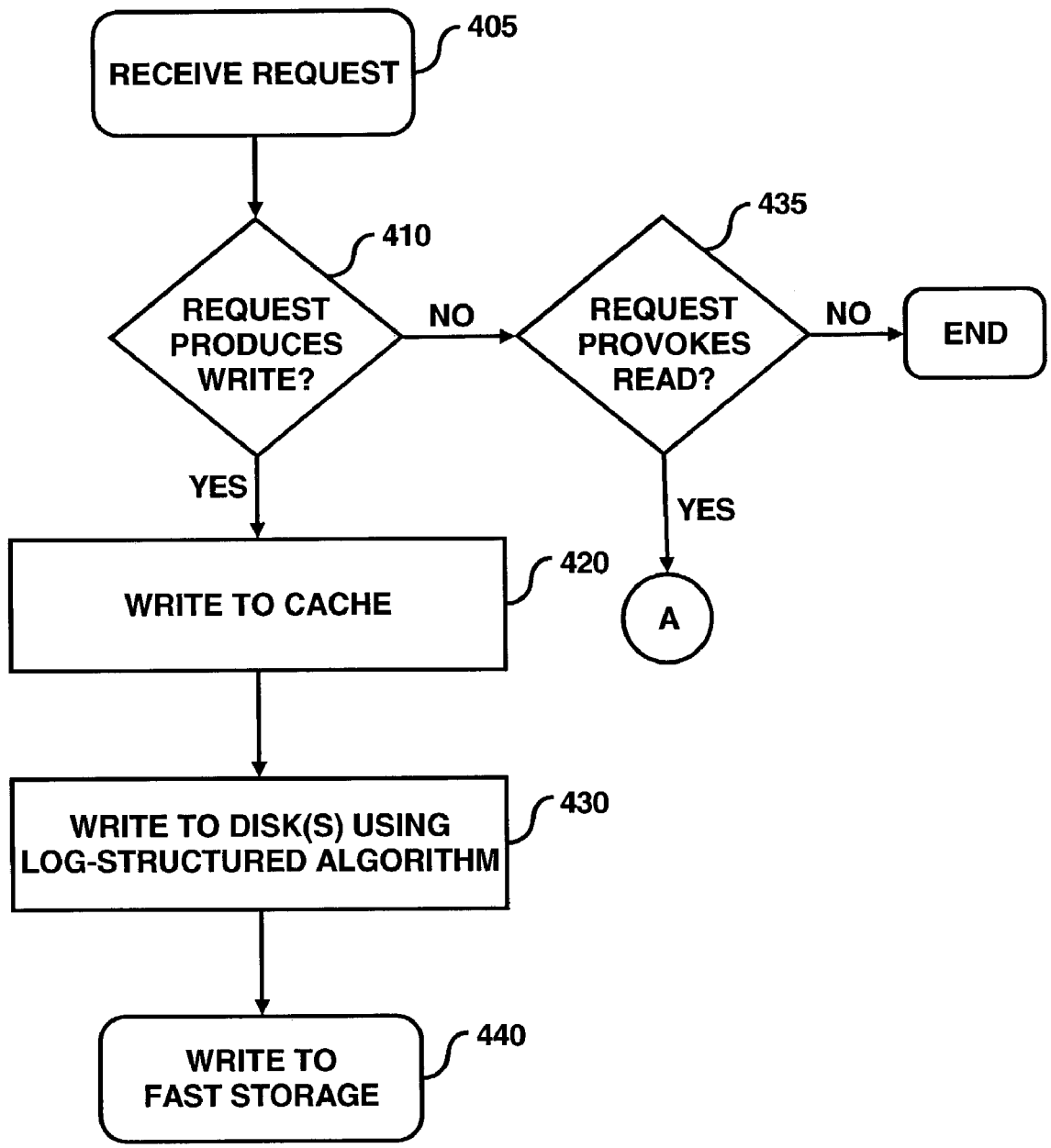
FIGS. 4 and 5 illustrate flow diagrams of an exemplary method for performing input/output (I/O) operations on the computer system shown in FIG. 1, according to an embodiment of the invention.

FIG. 4 illustrates a flow diagram of a method 400 for performing I/O operations on the storage device 110, according to an embodiment of the invention. The methods 400–600 are described below with respect to the computer system 100 shown in FIG. 1, but may be applied to other systems. In step 405, the controller 160 receives a request to perform a data operation. The request may be generated by one of the clients 120.

In step 410, the controller 160 determines whether the request provokes a write operation on the storage device 110. Write operations may be provoked by write requests from a client 120 and requests from the controller 160. If the request provokes a write operation, data is written to the cache 145 (step 420). Then, the data is written to the disk sub-array 140 and the fast storage sub-array 150 (steps 430 and 440). Data is written to the disk sub-array 140 using the log-structured algorithm. For example, the data is appended to a current extent and corresponding metadata is updated in a log. Write requests may be stored in the cache 145 until the sub-arrays 140 and 150 are available to perform the writes. It will be apparent to one of ordinary skill in the art that write requests from the controller 160, such as requests for a destaging operation from the cache 145, cause data to be written to the disk sub-array 140 and the fast storage sub-array 150 from the cache 145 (e.g., steps 430 and 440). Data is written to the disk sub-array 140 using the log-structured algorithm.

If a write operation is not found to be necessary in step 410, the controller 160 determines whether a read operation is provoked (step 435). Read operations may be provoked by read requests, read-ahead requests, etc. Read operations may be provoked by requests from a client 120 and/or the controller 160. In step 435, if a read operation is provoked, the steps shown in FIG. 5 are performed.

Figure 5:
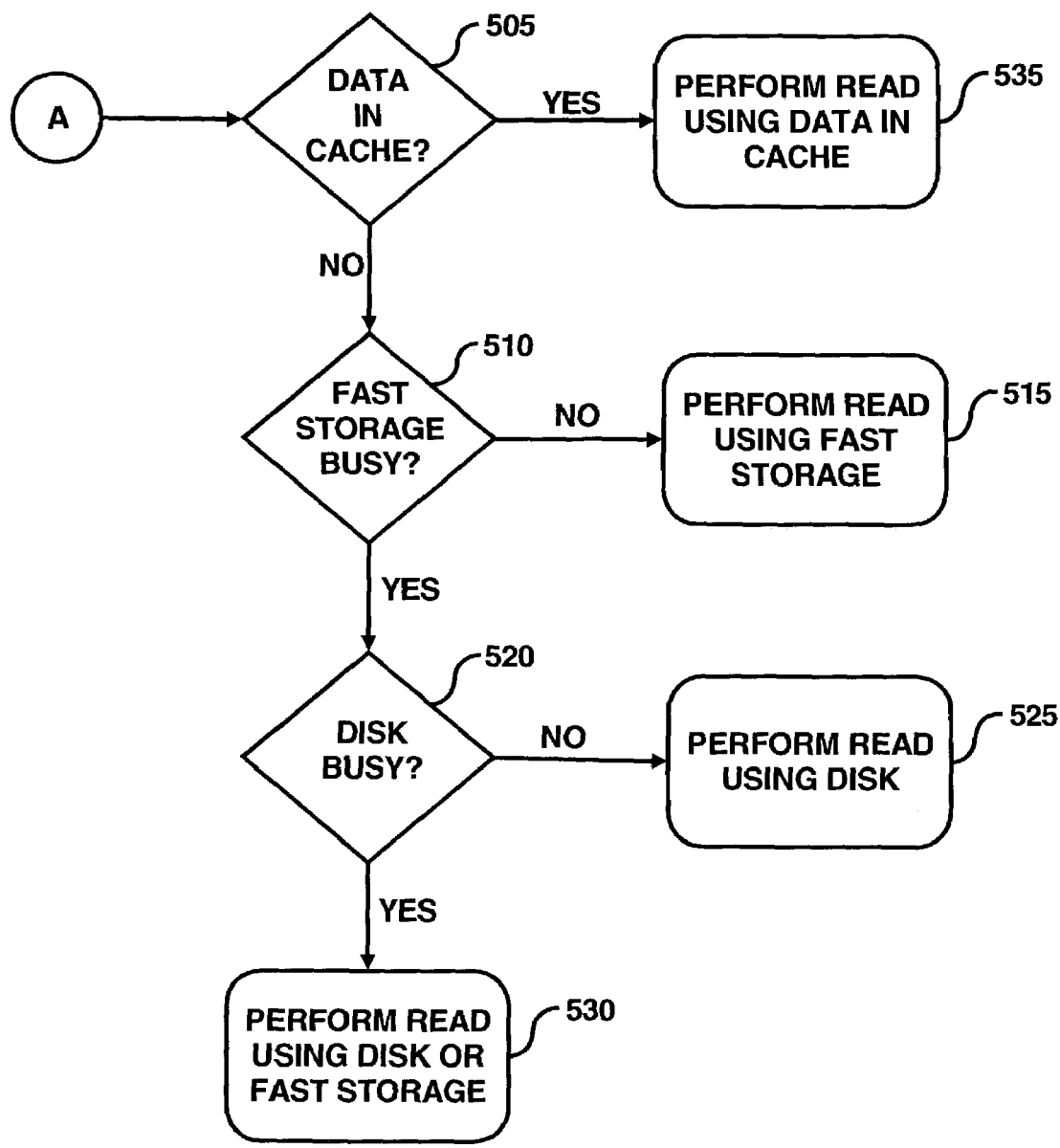

FIG. 5 illustrates a flow diagram of a method 500 for performing a read operation, according to an embodiment of the invention. In step 500, the controller 160 determines whether the requested data is in the cache 145 (step 505). If the requested data is in the cache 145, the data is read from the cache 145 (step 535). If the requested data is not in the cache 145, the controller 160 determines whether the fast storage sub-array 150 is busy (step 510). Generally reads are performed from the fast storage sub-array 150 to improve performance. A threshold may be set to determine whether the fast storage is busy (e.g., a predetermined number of I/O operations are pending for the fast storage sub-array 150).

If the fast storage sub-array 150 is not busy, the read is performed from the fast storage sub-array 150 (step 515). If the fast storage sub-array 150 is busy, then the controller 160 determines whether the disk sub-array 140 is busy (step 520). If the disk sub-array 140 is not busy, then the read is performed from the disk sub-array 140 (step 525). If the disk sub-array 140 is also busy, then the read may be performed from any of the sub-arrays 140 and 150 (step 530).

For fault recovery and to improve performance of I/O operations, two copies of data are stored in the storage device 110 (one copy on the disk sub-array 140 and one copy on the fast storage sub-array 150).

If a fast-storage device fails, the data is available in the disk sub-array 140. When a fast-storage device is replaced, the data can be copied back from the disk sub-array in an order which is as close to sequential on the disk as possible. The data on the disk is copied back to the fast storage device in the sequential order to minimize disk head movement and to maximize the disk throughput.

If a disk fails, the data is available on the fast storage sub-array 150. The data can be copied back to another disk from the fast store sub-array 150 when one becomes available, such as immediately if there is a hot spare disk or when the failed disk is replaced if there is not a hot spare. This copy can be made in the order which will cause the fewest disk head movements even if it causes non-contiguous accesses on the fast storage subarray 150, because the positioning time for the fast-store copy is small.

Figure 6:
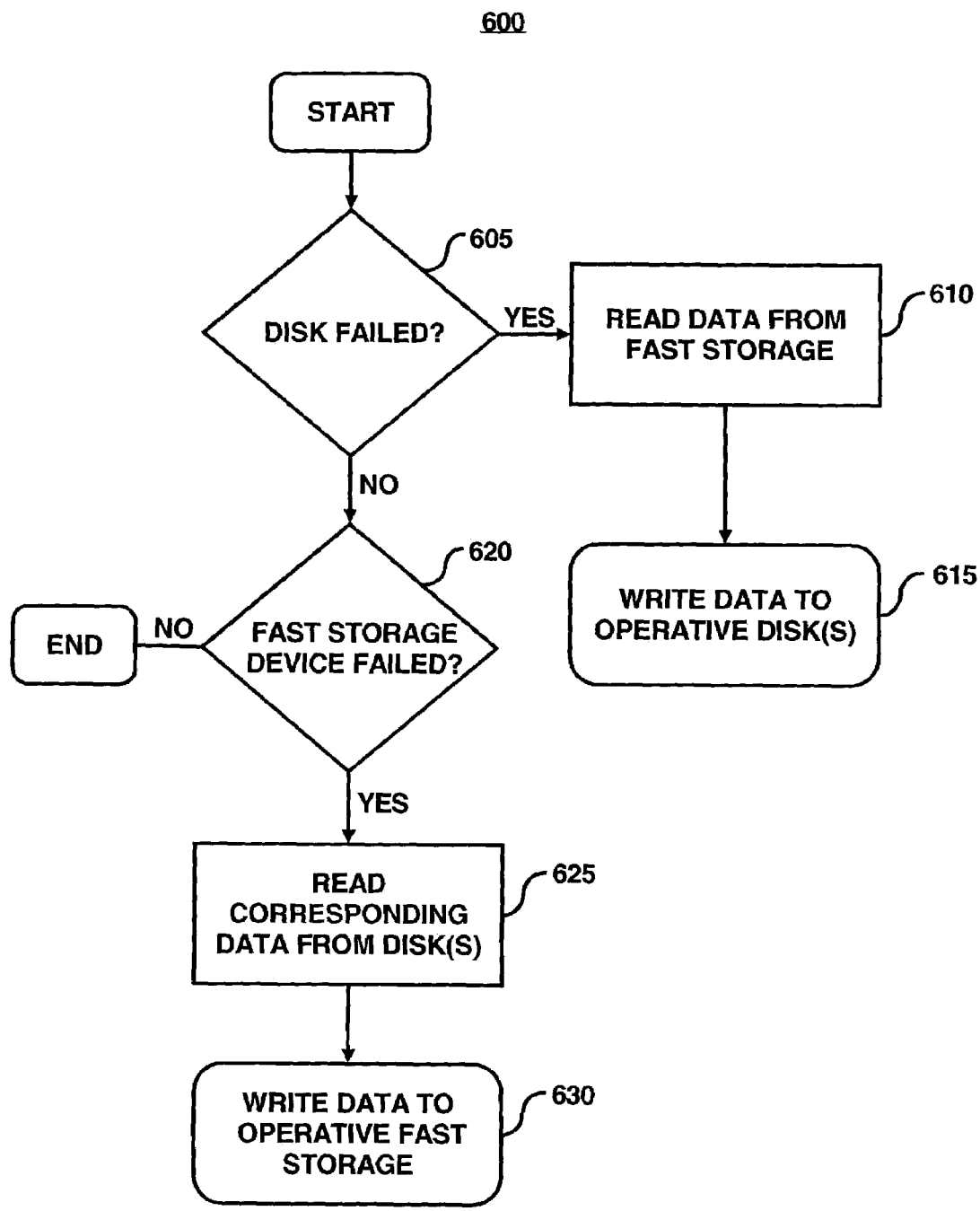
FIG. 6 illustrates a flow diagram of an exemplary method for fault recovery, according to an embodiment of the invention.

FIG. 6 illustrates a flow diagram of a method 600 for recovering from a failed disk or fast storage device in the storage device 110, according to an embodiment of the invention. In the step 605, the controller 160 determines whether a disk of the disk sub-array 140 failed. Disk failure may be detected using conventional techniques. If a disk is failed, the controller 160 reads corresponding data from the fast storage sub-array 150 into the buffer 142 (step 610). Then, the controller 160 writes the data to the operative disk(s) (step 615) using the log-structured algorithm, such as appending data to a current extent. An operative disk or fast storage device may include a spare or a replacement.

In step 620, the controller 160 determines whether a fast storage device of the fast storage sub-array 150 failed. Failure of a fast storage device may be detected using conventional techniques. If a fast storage device is failed, the controller 160 reads corresponding data from the disk(s) 140 into the buffer 142 (step 625). Then, the controller 160 writes the data to operative fast storage device(s) (step 630).

The steps of the method 600 may be performed in the background, giving priority to external I/O requests. Since the data read goes first into buffer 142, the reading and writing can proceed asynchronously. For example, the reading can proceed when the device to be written to is busy if there is space in the buffer. Similarly, writing can proceed as long as there is data for that device in the buffer.

The methods 300–600 are exemplary embodiments, and it will be apparent to one of ordinary skill in the art that these methods are subject to many alternatives, modifications and variations without departing from the spirit and scope of the invention. For example, some of the steps in the methods 300–600 may be performed in different orders or simultaneously. For example, in the method 300, the step 310 for identifying valid data and the step 320 for determining idle time may be performed in different orders. In the methods 400 and 500, the controller may simultaneously perform or perform in a different order step(s) for determining whether a read or a write is provoked. In FIG. 4, the step 430 for writing to disk(s) and the step 440 for writing to fast storage may be performed in parallel. These and other variations will be apparent to one of ordinary skill in the art.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A computer storage system comprising
a controller configured to perform data operations on a storage device array;
a cache; and
the storage device array comprises a first sub-array and a fast storage sub-array storing data redundant to data stored in the first sub-array, wherein the first sub-array includes at least one log-structured storage device and the fast storage sub-array includes at least one fast storage device;
wherein data is operable to be written from the cache to the first sub-array and the fast storage sub-array.

2. The computer storage system of claim 1, wherein the at least one log-structured storage device is divided into extents and the controller is operable to use a log-structured algorithm to write data into at least one of the extents, wherein each extent includes a predetermined amount of space on the at least one log-structured storage device.

3. The computer storage system of claim 1, wherein the log-structured algorithm comprises appending the data into the at least one extent and updating metadata in the cache associated with the data.

4. The computer storage system of claim 2, wherein the controller is operable to clean an extent of the at least one log-structured storage device, the extent to be cleaned including valid data.

5. The computer storage system of claim 4, wherein the controller is operable to read data corresponding to the valid data in an extent being cleaned from the fast storage sub array and append the data into at least one extent in the first sub-array using the log-structured algorithm.

6. The computer storage system of claim 4, wherein the controller is operable to mark the extent being cleaned as clean after all the valid data in that extent is appended to the at least one extent.

7. The computer storage system of claim 1, wherein the controller attempts to perform a read operation on the fast storage sub-array before attempting to perform the read operation on the first storage sub-array.

8. The computer storage system of claim 1, wherein the controller is configured to write data to the first sub-array in a log-structured layout and write the redundant data to the fast storage device sub-array.

9. The computer storage system of claim 8, wherein the redundant data comprises at least a copy of the data stored in the first sub-array.

10. The computer storage system of claim 1, wherein the fast storage sub-array comprises one or more of MEMS, flash RAM, magneto-resistive RAM.

11. The computer storage system of claim 1, wherein the first storage sub-array comprises one or more disks.

12. The computer storage system of claim 1, wherein new data written to the log-structured storage device is appended to the log-structured storage device.

13. A computer storage apparatus comprising:
a controller means for performing data operations in a storage array means for storing data;
a cache means for caching data; and
the storage array means comprises a first sub-array means for storing data using a log-structured algorithm and a fast storage sub-array means for storing data redundant to data stored in the first sub-array means, wherein the fast storage sub-array means includes one or more fast storage devices,
wherein data is operable to be written from the cache means to the first sub-array means and the fast storage sub-array means.

14. The computer storage apparatus of claim 13, wherein the first sub-array includes at least one log-structured storage device divided into extents and the controller means is operable to use the log-structured algorithm to write data into at least one of the extends, wherein each extent includes a predetermined amount of space on the at least one log-structured storage device.

15. The computer storage apparatus of claim 14,
wherein the cache means is operable to store metadata associated with the data written into the at least one extent using the log-structured algorithm.

16. The computer storage apparatus of claim 14, wherein the controller means is operable to clean an extent of the at least one log-structured storage device, the extent being cleaned including valid data.

17. The computer storage apparatus of claim 16, wherein cleaning the extent comprises reading data from the fast storage means, the read data corresponding to valid data in the extent being cleaned; and writing the valid data into at least one extent in the first sub-array means using the log-structured algorithm.

18. The computer storage apparatus of claim 17, wherein the controller means is operable to mark the extent being cleaned as clean after all the valid data is appended to the at least one extent.

19. The computer storage apparatus of claim 13, wherein the controller means attempts to perform a read operation on the fast storage sub-array means before attempting to perform the read operation on the first sub-array means.

20. The computer storage apparatus of claim 13, wherein the controller means is operable to write data to the first sub-array means and write the redundant data to the fast storage sub-array means.

21. A method of recovering from a failed device in a storage system having at least one log-structured storage device and at least one fast storage device storing data redundant to data stored in the at least one log-structured storage device, the method comprising steps of:
determining whether the at least one log-structured storage device failed;
reading data from the at least one fast storage device in response to the at least one log-structured storage device being failed, the read data including data redundant to the data stored on the at least one failed log-structured storage device; and
writing the redundant data to a log-structured storage device that is operative in the storage system.

22. The method of claim 21, wherein the step of writing the redundant data comprises appending the redundant data to a current extent in the operative log-structured storage device.

23. The method of claim 21, further comprising steps of:
determining whether the at least one fast storage device failed;
reading data from the at least one log-structured storage device in response to the at least one fast storage device being failed, the data being read including data redundant to the data stored on the at least one failed fast storage device; and writing the data redundant to the data stored on the failed fast storage device to an operative fast storage device in the storage system.

24. The method of claim 23, wherein the step of reading data from the at least one log-structured storage device comprises reading the redundant data from the at least one log-structured storage device in an order that minimizes positioning delays in the at least one log-structured storage device.

25. In a computer storage system including at least one log-structured storage device and at least one fast storage device storing data redundant to data stored in the at least one log-structured storage device, wherein the at least one log-structured storage device is divided into extents for storing data, a method for cleaning an extent comprises steps of:
   identifying valid data in an extent being cleaned in the log-structured storage device;
   retrieving a copy of the valid data from the at least one fast storage device; and
   appending the copy of the valid data to a current extent in the at least one log-structured storage devices,
   wherein the current extent comprises one or more of a current extent in the at least one log-structured storage device, a clean extent nearest to the previous current extent, and an extent with a greatest number of invalid blocks at the time the previous current extent became full.

26. The method of claim 25, wherein the step of retrieving comprises steps of:
   detecting an idle time for the at least one fast storage device; and
   retrieving the copy of the valid data from the at least one fast storage device to a buffer during the idle time for the at least one fast storage device.

27. The method of claim 25, wherein the step of appending comprises steps of:
   appending the copy of the valid data from the buffer to the current extent in the at least one log-structured storage device.

28. The method of claim 25, wherein the computer storage system comprises a first storage sub-array including the at least one log-structured storage device and a fast storage sub-array including the at least one fast storage device.

29. A method of performing data operations in a storage system comprising at least one log-structured storage device and at least one fast storage device, the method comprising steps of:
   receiving a request to perform a data operation;
   determining whether the request provokes a write operation on the storage system;
   in response to the request provoking a write operation, writing data to the at least one log-structured storage device and writing redundant data to at least one fast storage device;
   determining whether the request provokes a read operation on the storage system;
   determining whether the at least one fast storage device is busy in response to the request provoking a read operation;
   reading data from the at least one fast storage device in response to the at least one fast storage device not being busy; and
   reading data from any one of the at least one log-structured storage device and the at least one fast storage device in response to the at least one fast storage device being busy.

30. The method of claim 29, wherein the at least one log-structured storage device is divided into a plurality of extents for storing data, and the step of writing data comprises appending data to a current extent of the plurality of extents.

31. The method of claim 29, wherein the step of determining whether the request provokes a read operation on the storage system further comprises steps of:
   determining whether requested data is in a cache in response to the request provoking a read operation; and
   reading the requested data from the cache in response to the requested data being in the cache.

32. The method of claim 29, further comprising writing data to a cache in response to the request provoking a write operation.
   writing the data redundant to the data stored on the failed fast storage device to an operative fast storage device in the storage system.

* * * * *

UNITED STATES PATENT AND TRADEMARK OFFICE
CERTIFICATE OF CORRECTION

PATENT NO. : 7,073,029 B2  Page 1 of 1
APPLICATION NO. : 10/351357
DATED : July 4, 2006
INVENTOR(S) : Mustafa Uysal et al.

It is certified that error appears in the above-identified patent and that said Letters Patent is hereby corrected as shown below:

In column 7, line 8, in Claim 1, after "comprising" insert -- : --.

In column 8, line 12, in Claim 14, delete "extends" and insert -- extents --, therefor.

In column 9, line 22, in Claim 25, delete "devices" and insert -- device --, therefor.

In column 10, lines 40-42, in Claim 32, delete "writing the data redundant to the data stored on the failed fast storage device to an operative fast storage device in the storage system.".

Signed and Sealed this

Twenty-eighth Day of April, 2009

JOHN DOLL
*Acting Director of the United States Patent and Trademark Office*